United States Patent [19]
Barkus et al.

[11] Patent Number: 5,857,046
[45] Date of Patent: Jan. 5, 1999

[54] STRAIN RELIEF

[75] Inventors: Lee Andrew Barkus, Millersburg; Ronald Allan Hileman, Camp Hill, both of Pa.

[73] Assignee: The Whitaker Corporation, Wilmington, Del.

[21] Appl. No.: 798,814

[22] Filed: Feb. 12, 1997

[51] Int. Cl.⁶ .................................................. G02B 6/36
[52] U.S. Cl. ............................ 385/86; 385/60; 385/53; 385/72; 385/78
[58] Field of Search .................................. 385/86, 53, 55, 385/58, 60, 62, 72, 76, 77, 78, 81, 87

[56] References Cited

U.S. PATENT DOCUMENTS

| | | | |
|---|---|---|---|
| 4,787,706 | 11/1988 | Cannon, Jr. et al. | 350/96.2 |
| 4,826,277 | 5/1989 | Weber et al. | 350/96.23 |
| 5,202,942 | 4/1993 | Collins et al. | 385/87 |
| 5,363,459 | 11/1994 | Hultermans | 385/60 |
| 5,425,119 | 6/1995 | Lee et al. | 385/86 |

*Primary Examiner*—Phan T. H. Palmer
*Attorney, Agent, or Firm*—Gerald K. Kita; Samuel W. Apicelli

[57] ABSTRACT

The invention relates to an improved strain relief adapted for mounting within a connector housing so as to protect a terminated cable assembled thereto from damage as a result of flexure of the cable relative to the housing. The strain relief including a sleeve having a proximal portion, a distal portion, and a central lumen disposed therebetween. The sleeve being adapted to slidingly receive the cable within the central lumen. The distal portion of the strain relief includes a substantially rigid tube that has a pair of shoulders which project radially-outwardly from an external surface of the distal portion in diametrically-opposed relation to one another. An annular shoulder is positioned in spaced relation to the pair of shoulders and projects radially-outwardly from the external surface of the strain relief. A recess is defined between the pair of shoulders and the annular shoulder. The strain relief structure is adapted to be assembled to a correspondingly shaped receptacle portion of a connector housing.

8 Claims, 5 Drawing Sheets

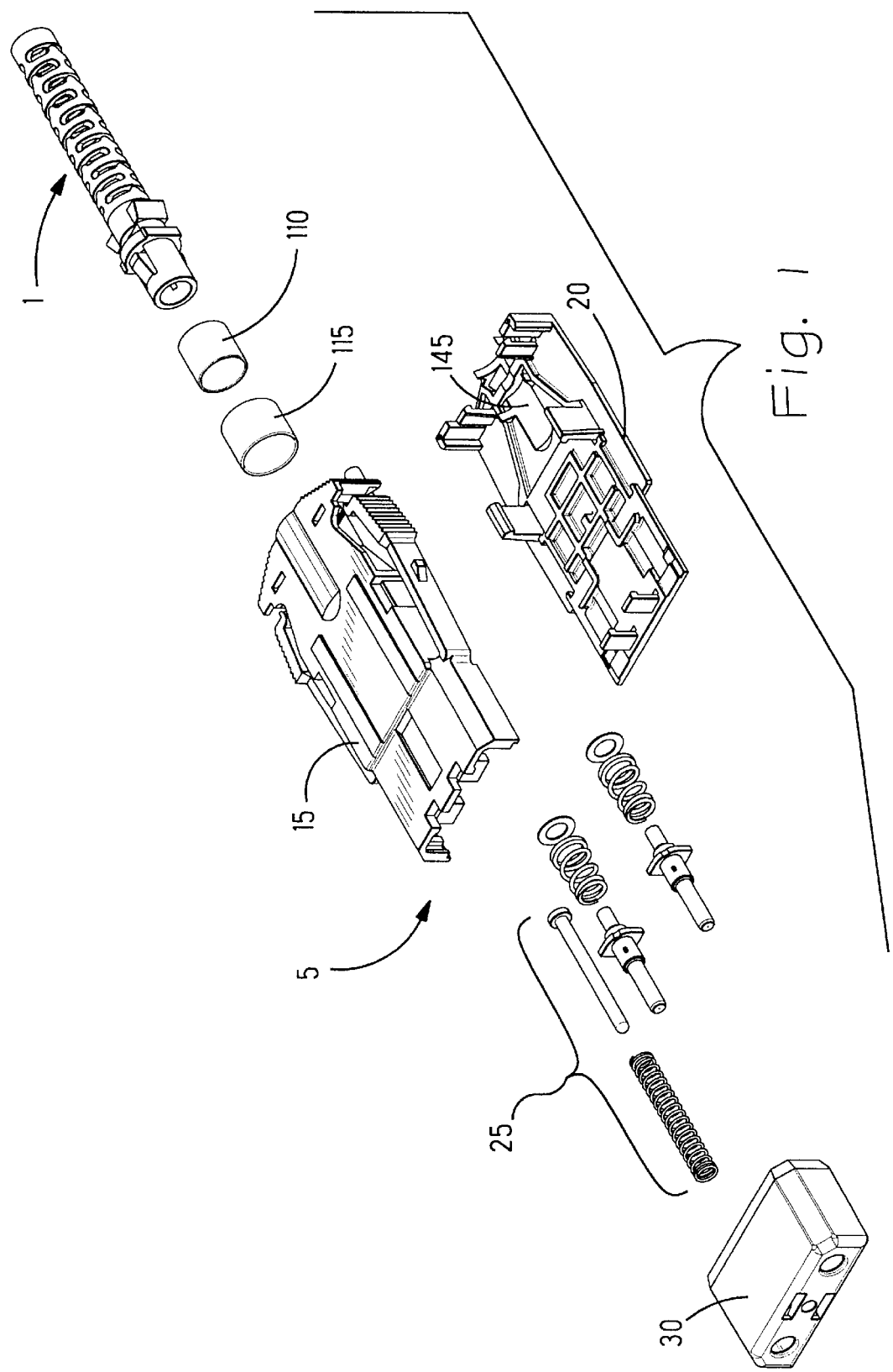

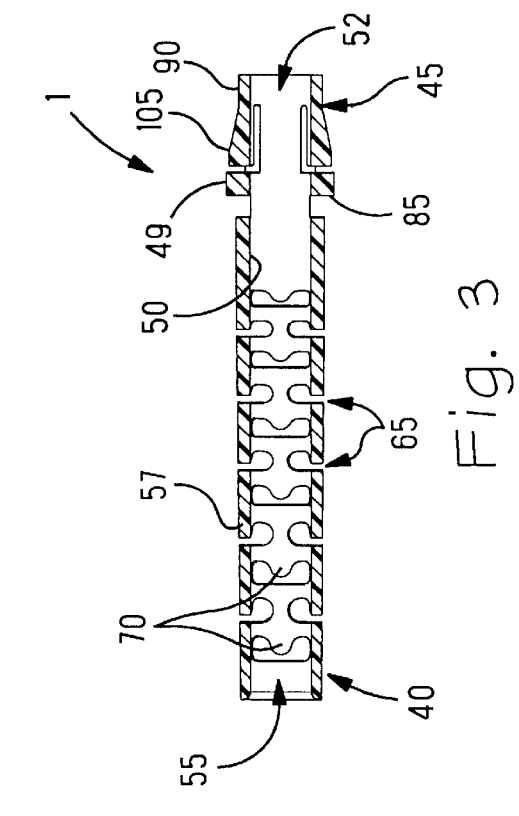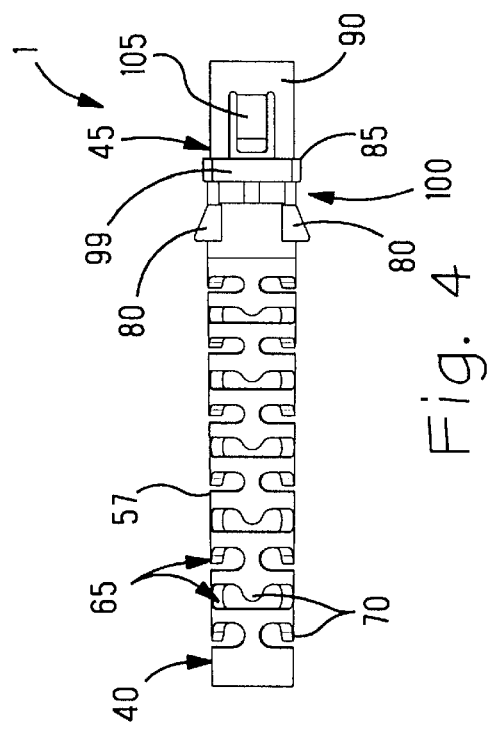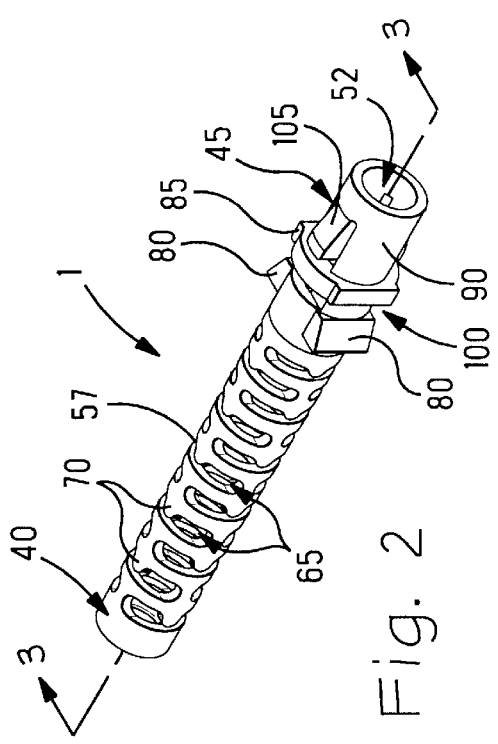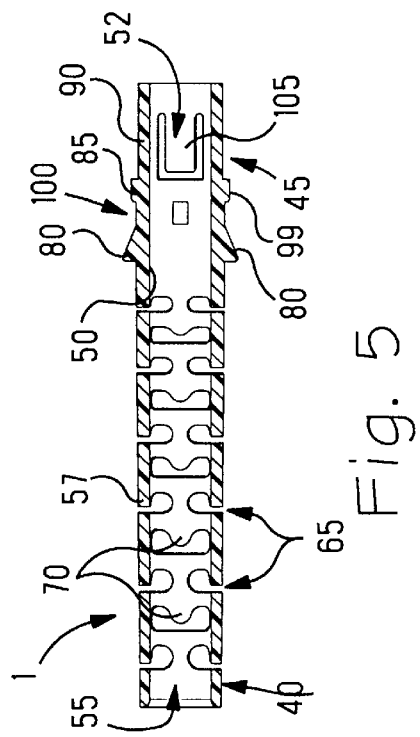

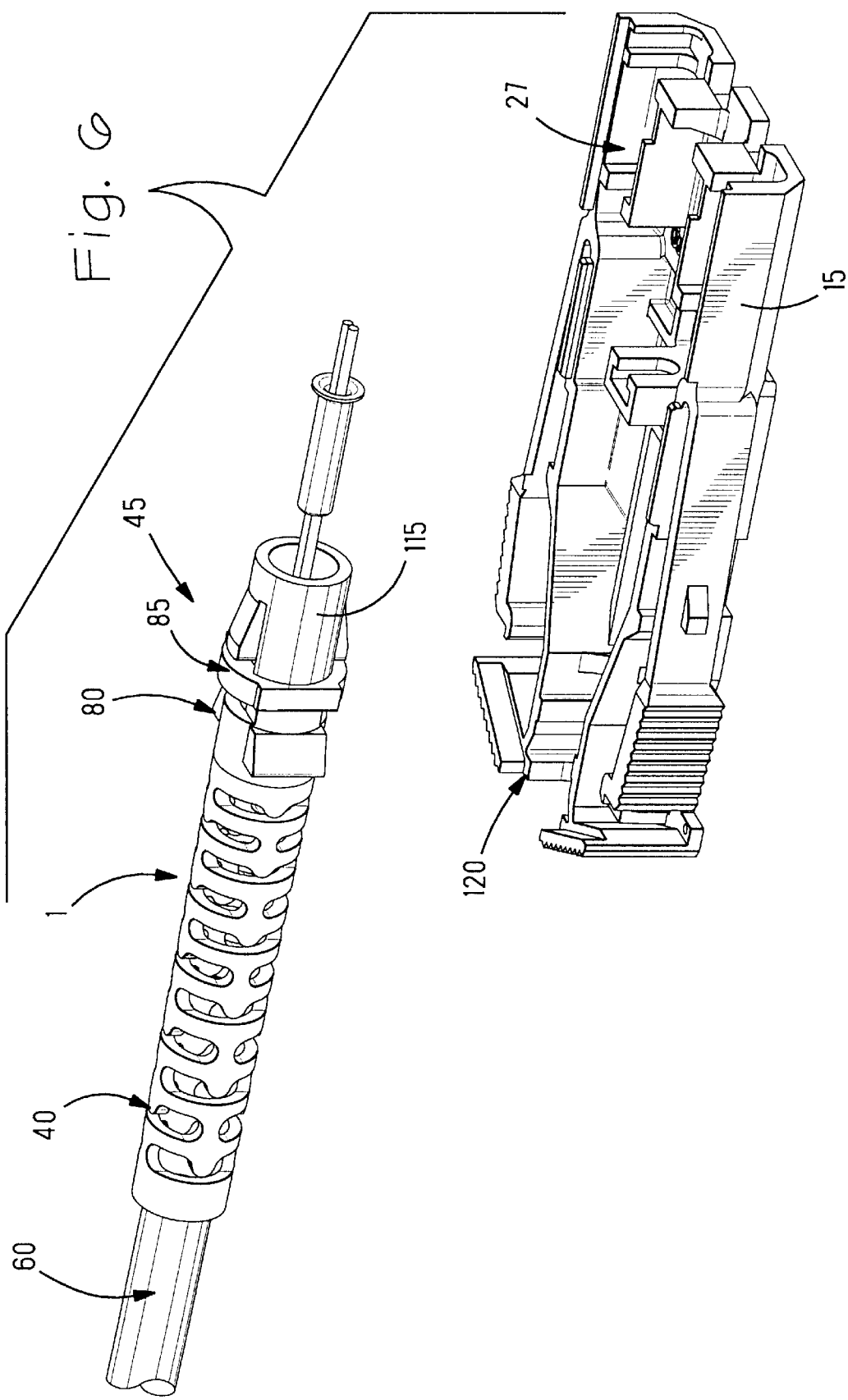

STRAIN RELIEF

FIELD OF THE INVENTION

The present invention generally relates to the field of optical fiber connectors, and more particularly to an optical fiber connector termination having an improved strain relief.

BACKGROUND OF THE INVENTION

Optical fiber connectors are often subjected to severe external stresses which can damage the connectors and cause misalignment or separation of the optical fibers that are mated by the connectors. For example, in applications where connectors are subject to frequent connection and disconnection, stresses are often placed on an optical fiber cable which can loosen or otherwise damage the attachment of that cable to the connector. This damage often interferes with the efficient transmission of a signal between the optical fibers of the mated connectors.

The incorporation of a strain relief structure into an optical fiber connector so as to help isolate the delicate optical fibers from external stresses and to help maintain the integrity of the optical fiber connection is well known. See, for example, U.S. Pat. Nos. 4,787,706; 4,826,277; 4,588,256; 4,729,619; 4,909,583; and 5,202,942.

None of the fiber optic strain relief structures developed to date are completely satisfactory. In particular, many of these prior art strain relief structures require a significant amount of excess material so as to provide the requisite strength and stability. This often results in bulky and expensive designs that are difficult to assemble.

For example, U.S. Pat. No. 5,202,942, issued to Collins et al., discloses a cable termination member having a strain relief feature for isolating the optical fiber members from external stresses in a terminated optical fiber cable. The cable termination member is adapted to terminate an optical fiber cable which includes at least one optical fiber member, a load bearing member around the fiber, and an outer jacket surrounding the load bearing member. This design also includes a first outer crimp member that is adapted to receive an end of the optical fiber cable and a second outer crimp member that is crimped to the first outer crimp member with an exposed portion of the load bearing member crimped therebetween. An inner crimp member is positioned in the cable between the optical fiber member and the load bearing member and within the first and second outer crimps. This structure is adapted to secure the cable jacket between the first outer crimp member and the inner crimp. The inner crimp comprises a ring or eyelet that firmly secures both the load bearing member and the jacket of the cable to the termination member to provide improved strain relief for protecting optical fiber members disposed within the cable against external stresses. An annular outwardly extending flange is provided on the body of the cable termination member. This flange projects outwardly so as to engage a corresponding slot defined in a connector housing. When the cable termination member is assembled to a connector housing, the flange protrudes through the housing wall so as to provide added tensile strength to the termination member.

SUMMARY OF THE INVENTION

The foregoing and other deficiencies in the prior art are remedied through the provision of a strain relief adapted for mounting within a connector housing and thereby protecting a terminated cable, that is assembled thereto, from damage as a result of flexure of the cable relative to the housing. The strain relief comprises a sleeve having a proximal portion, a distal portion, and a central lumen extending between open ends of the sleeve. The sleeve is adapted to slidingly receive the cable within the central lumen. Advantageously, the distal portion of the strain relief comprises a substantially rigid tube that includes a pair of shoulders which project radially-outwardly from an external surface of the distal portion in diametrically-opposed relation to one another, and an annular shoulder that is positioned in spaced relation to the pair of shoulders. The annular shoulder projects radially-outwardly from the external surface of the strain relief. A recess is defined between the pair of shoulders and the annular shoulder.

The strain relief of the present invention is adapted to be received within a receptacle internally disposed in a connector housing. The connector housing comprises a first half and a second half adapted to be assembled so as to form a whole connector housing. Each connector half includes a corresponding half-portion of the receptacle, so that when the connector is assembled around the strain relief, the strain relief will be disposed within the receptacle. As a result of this construction, each receptacle half is adapted to be assembled in snug surrounding-relation to the distal portion of the strain relief and thereby to support the strain relief during flexure of the cable.

BRIEF DESCRIPTION OF THE DRAWINGS

These and other objects, features and advantages of the present invention will be more fully disclosed in, or rendered obvious by, the following detailed description of the preferred embodiment of the invention, which is to be considered together with the accompanying drawings wherein like numbers refer to like parts and further wherein:

FIG. 1 is an exploded perspective view of a multiple optical fiber connector assembly comprising the improved strain relief of the present invention;

FIG. 2 is a perspective view of the improved strain relief of the present invention;

FIG. 3 is a cross-sectional view of the improved strain relief, as taken along line 3—3 in FIG. 2;

FIG. 4 is a side elevational view of the improved strain relief shown in FIG. 2;

FIG. 5 is a cross-sectional view of the improved strain relief shown in FIG. 4, as taken along line 5—5;

FIG. 6 is a perspective view of one half of a connector housing and an improved strain relief that has been assembled to a jacketed fiber optic cable;

DETAILED DESCRIPTION OF THE PREFERRED EMBODIMENT

Figure 7:
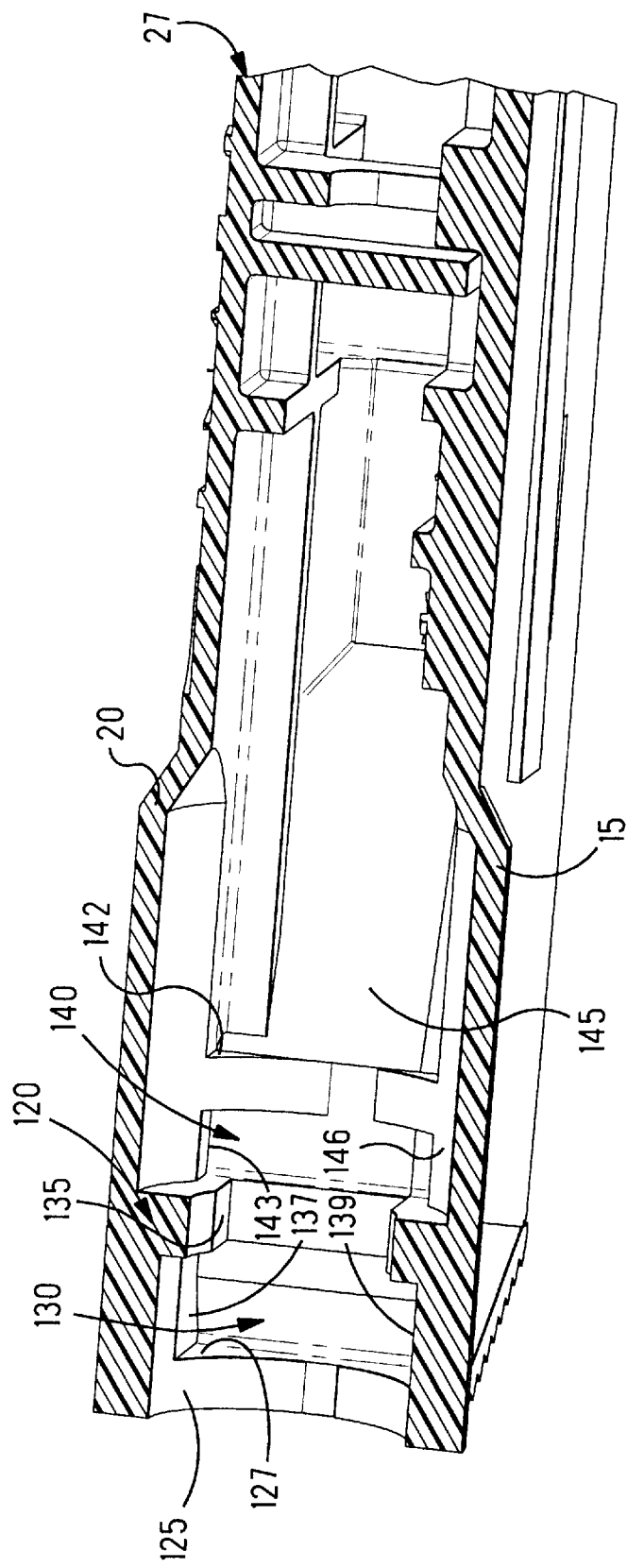
FIG. 7 is a broken-away sectional view of a proximal portion of a partially assembled connector housing showing half of a strain relief receptacle but with the improved strain relief removed for clarity of illustration.

Referring to FIG. 1, strain relief 1 is adapted for use with a fiber optic connector assembly 5 comprising a first housing-half 15, a second housing-half 20, a pair of plug assemblies 25, and an alignment subhousing 30. Unlike strain relief 1, some prior art strain relief designs require openings to be formed in each of the housing halves so as to provide a slot capable of receiving a portion of the strain relief member. The positioning of a portion of the strain relief member within the slots provides some additional resistance to the tensile forces exerted upon the cable. These prior art designs often require significantly more material to be disposed about these slots so as to absorb the stress placed upon the housing through the strain relief. This can result in a bulkier and less cost effect design.

Referring now to FIGS. 1–5, strain relief 1 has a substantially tubular structure comprising a proximal portion 40 and a distal portion 45. A central lumen 50 extends through strain relief 1 between open ends 52 and 55. Lumen 50 is sized and shaped so as to be capable of slidingly receiving a jacketed fiber optic cable 60 (FIG. 6) of the type that is well known in the art. Proximal portion 40 forms a tapered sleeve 57. Tapered sleeve 57 defines a plurality of regularly spaced elongated slots 65 transversely through the thickness of proximal portion 40. A plurality of protrusions 70 project longitudinally from the lateral sides of tapered sleeve 57 so as to project into the void space of each slot 65.

Distal portion 45 comprises a cylindrical and substantially rigid tube including a pair of outer shoulders 80, an inner annular shoulder 85 and a cylindrical crimp body 90. More particularly, each outer shoulder 80 projects radially-outwardly from the exterior surface of distal portion 45, adjacent to the distal end of proximal portion 40. Outer shoulders 80 are positioned in diametrically-opposed, spaced-relation to one another, and comprise a generally inclined-ramp shape (FIGS. 1–2 and 4–5). Inner annular shoulder 85 is spaced away from each outer shoulder 80 and projects radiallyoutwardly from the exterior surface of distal portion 45. Inner annular shoulder 85 includes a pair of truncated lateral sides 99 that are positioned in aligned-relation with outer shoulders 80. An annular recess 100 is defined between outer shoulders 80 and inner annular shoulder 85, and is sized and shaped to receive a corresponding feature of housing-halves 15,20, as will hereinafter be disclosed in further detail.

Crimp body portion 90 comprises a relatively rigid tubular shape. A pair flexible finger elements 105 project proximally away from open end 52 so as to form a pair of diametrically-opposed cantilevered ramps. Flexible finger elements 105 are adapted to be pushed inwardly against jacketed fiber optic cable 60 when a pair of outer crimp rings 110 and 115 (FIG. 1) are crimped thereon to further secure jacketed fiber optic cable 60 to strain relief 1.

Figure 8:
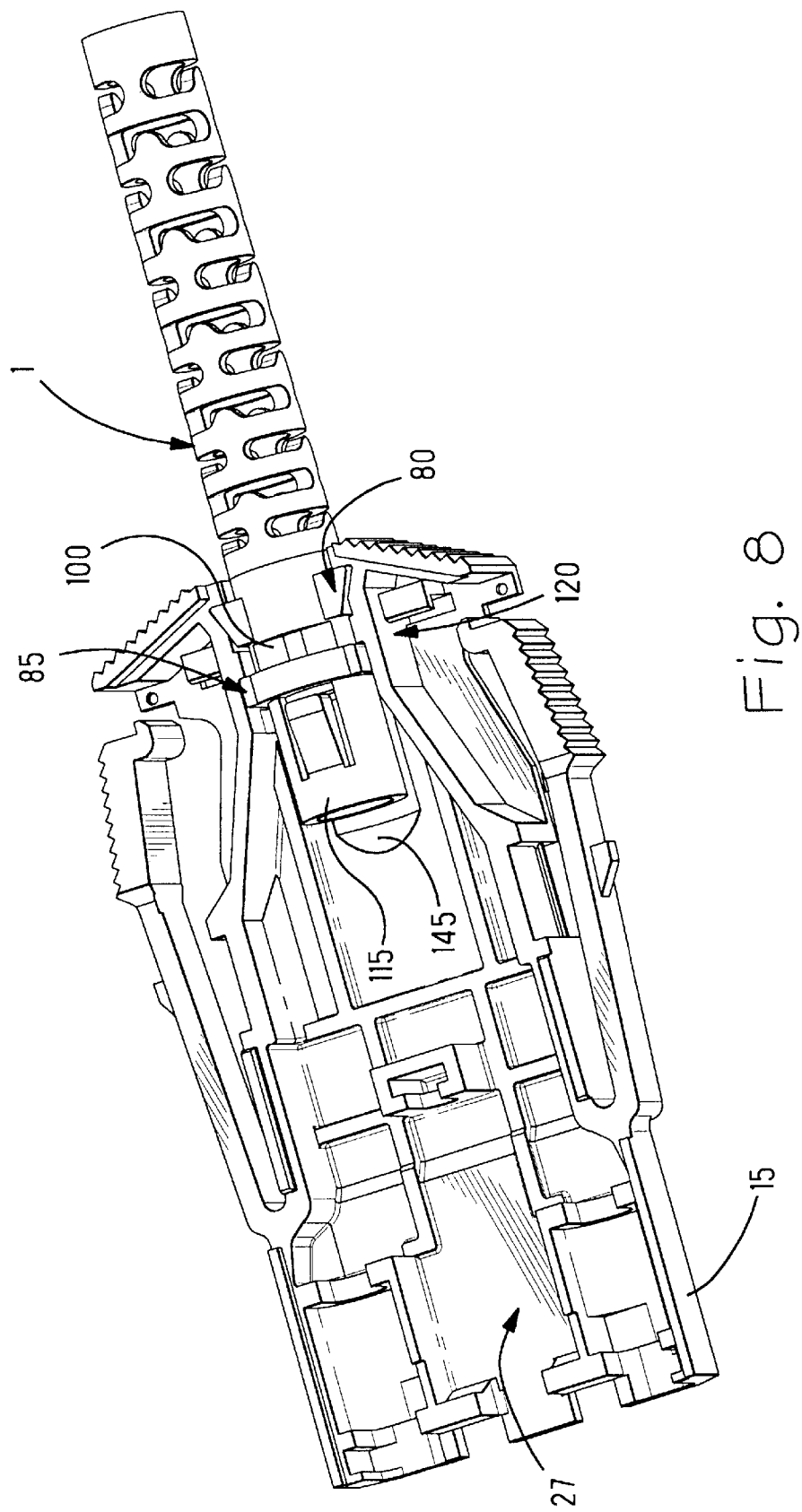
FIG. 8 is a perspective view, similar to that shown in FIG. 6, but with the improved strain relief mounted in one half of the receptacle and with the jacketed fiber optic cable removed for clarity of illustration.

Referring now to FIGS. 1 and 6–8, first and second housing-halves 15,20 comprise a distal portion 27 adapted to receive conventional assemblies 25 and subhousing 30. The internal proximal portion of each housing-half 15,20 comprises corresponding halves of a receptacle 120 that is especially adapted to receive and snugly engage distal portion 45 of strain relief 1 (FIG. 8).

More particularly, each receptacle 120 comprises an outer wall 125, a first recess 130, a first internal shoulder 135, a second recess 140, a cradling shoulder 142, and a concave nest 145 (FIGS. 1, 7 and 8). Outer wall 125 defines a substantially circular opening that is sized and shaped so as to snugly receive the distal end of proximal portion 40 (FIG. 8). First recess 130 is formed between the inner surface 127 of outer wall 125 and first internal shoulder 135. Side walls 137 and 139 are disposed in confronting spaced-relation to one another, and extend between outer wall 125 and first internal shoulder 135 so as to define the void space of first recess 130. Advantageously, the shape of first recess 130 substantially corresponds to the profile of distal portion 45 at the region where each outer shoulder 80 is located. In particular, side walls 137 and 139 flare outwardly as they extend toward inner surface 127 of outer wall 125 so as to provide a profile that substantially corresponds to the inclined-ramp shape of each outer shoulder 80.

Second recess 140 is formed between first internal shoulder 135 and cradling shoulder 142. Side walls 143 and 146 are disposed in confronting spaced-relation to one another, and extend between first internal shoulder 135 and cradling shoulder 142 so as to define the void space of second recess 140. Second recess 140 comprises a substantially-rectilinear shape that corresponds to the profile of truncated lateral sides 99 of inner shoulder 85. Cradling shoulder 142 and concave nest 145 comprise a rounded shape so as to support crimp body portion 90 when jacketed fiber optic cable 60 is assembled to it.

Referring once more to FIGS. 1 and 6, strain relief 1 is assembled to jacketed fiber optic cable 60 in the following manner. Jacketed fiber optic cable 60 is first slid through central lumen 50 of strain relief 1 until a portion of the cable projects outwardly from open end 52. In this position, the jacket is peeled back onto itself and over crimp body portion 90. Next, crimp rings 110 and 115 are slid sequentially over the portion of the outer jacket of the cable that has been positioned on crimp body 90. Crimp rings 110 and 115 are then crimped onto crimp body portion 90 (via a conventional crimping tool) so as to secure the cable to strain relief 1, as shown FIG. 6. It will be appreciated that when crimp rings 110,115 are crimped over the cable jacket and crimp body 90, finger elements 105 will flex inwardly so as to engage the outer surface of jacketed fiber optic cable 60 and further secure it to strain relief 1.

Once jacketed fiber optic cable 60 has been assembled and secured to strain relief 1, the strain relief assembly may be positioned within housing-halves 15,20 so as to form the completed connector assembly. More particularly, strain relief 1 is oriented so as to position outer shoulders 80 above first recess 130 and inner annular shoulder 85 above second recess 140. From this position, strain relief 1 is moved toward a housing-half 15 or 20 until outer shoulders 80 and inner annular shoulder 85 are fully seated within first and second recesses 130,140 and first internal shoulder 135 is seated within annular recess 100. A second housing-half 15 or 20 is then positioned above the first housing-half having the strain relief disposed therein. Second housing-half 15 or 20 is then moved toward first housing-half 15 or 20 until the remaining portions of outer shoulders 80 and inner annular shoulder 85 are received within their respective recesses 130,140 and first internal shoulder 135 is seated within annular recess 100.

It will be appreciated that, unlike prior art strain relief structures, no portion of strain relief 1 is required to extend into or through housing-halves 15, 20. More particularly, first recess 130 is sized and shaped so as to snugly receive each outer shoulder 80 and second recess 140 is sized and shaped so as to snugly receive inner annular shoulder 85, without any portion of strain relief 1 projecting into the housing walls. Advantageously, the flared profile of first recess 130, adjacent to inner surface 127 and side wall 137, provides a large surface area for each outer shoulder 80 to bare upon when jacketed fiber optic cable 60 is subjected to tensile loads. Additionally, the positioning of first internal shoulder 135 snugly between outer shoulders 80 and inner annular shoulder 85 provides increased structural support to the assembly, thus enabling jacketed fiber optic cable 60 to adequately resist both longitudinal and transverse flexure relative to connector assembly 5.

In other words, positioning of outer shoulders 80 and inner annular shoulder 85 within recesses 130 and 140 not only restricts the movement of strain relief 1 longitudinally, relative to housing-halves 15, 20, but also restricts the transverse movement of strain relief 1 during flexure of the fiber optic cable. As a result of this construction, when jacketed fiber optic cable 60 is flexed side to side or up and down, outer shoulders 80 are structurally supported by inner surface 127, first internal shoulder 135, and side walls 137,139 so as to absorb flexure induced stresses. Likewise, inner annular shoulder 85 is structurally supported by first internal shoulder 135, cradling shoulder 142, and side walls 143,146 so as to further absorb flexure induced stresses.

It is to be understood that the present invention is by no means limited to the precise constructions herein disclosed and shown in the drawings, but also comprises modifications and equivalents within the scope of the appended claims.

What is claimed is:

1. A strain relief adapted for mounting within a connector housing so as to protect a terminated cable assembled thereto from damage as a result of flexure of said cable relative to said housing, said strain relief comprising, in combination:

a sleeve having a proximal portion, a distal portion, and a central lumen extending therebetween, said sleeve being adapted to slidingly receive said cable within said central lumen;

said distal portion of said strain relief comprising a substantially rigid tube including a pair of shoulders that project radially-outwardly from an external surface of said distal portion in diametrically-opposed relation to one another and an annular shoulder spaced away from said pair of shoulders and projecting radially-outwardly from said external surface wherein a recess is defined between said pair of shoulders and said annular shoulder and further wherein said connector housing comprises a receptacle adapted to snugly receive said strain relief so as to substantially absorb stresses induced therein during said flexure of said terminated cable.

2. A strain relief according to claim 1 wherein said receptacle comprises a first half and a second half each adapted to be assembled in surrounding relation to said strain relief so as to form a whole receptacle within said connector housing, each receptacle half including an outer wall, a first internal shoulder disposed in spaced-relation to said outer wall so as to define a first recess therein that comprises a profile that is substantially similar to the shape of said outer shoulders and a second internal shoulder disposed in spaced-relation to said first internal shoulder so as to define a second recess therebetween that comprises a profile that is substantially similar to the shape of said annular shoulder.

3. A strain relief according to claim 2 wherein said outer shoulders comprise a substantially inclined-ramp shape.

4. A strain relief according to claim 2 wherein said annular shoulder comprises at least two truncated sides.

5. A strain relief according to claim 1 wherein said sleeve is tapered.

6. A strain relief according to claim 1 wherein said sleeve defines a plurality of regularly spaced elongated slots transversely through the thickness of said proximal portion of said sleeve and a plurality of protrusions that each project longitudinally into the void defined by each said slot and from the portions of said sleeve that define the lateral sides of said slots.

7. A strain relief according to claim 1 wherein said distal portion of said sleeve includes a crimp body portion comprising a relatively rigid tubular shape and having a pair of diametrically-opposed cantilevered ramps formed therein, said ramps being adapted to be pushed inwardly against said cable when at least one outer crimp ring is crimped thereover so as to further secure said cable to said strain relief.

8. A strain relief adapted for mounting within a connector housing so as to protect a terminated cable assembled thereto from damage as a result of flexure of said cable relative to said housing, said strain relief comprising:

a tapered tubular proximal portion and a tubular distal portion said strain relief being adapted to slidingly receive said cable therein;

said tubular distal portion comprising a pair of ramp-shaped shoulders each projecting radially-outwardly from an external surface of said tubular distal portion in diametrically-opposed relation to one another and an annular shoulder disposed in spaced relation to said pair of shoulders and projecting radially-outwardly from said external surface wherein a recess is defined between said pair of shoulders and said annular shoulder; and further wherein said connector housing comprises a receptacle adapted to snugly receive said strain relief so as to substantially absorb stresses induced therein during said flexure of said terminated cable, said receptacle comprising a first internal shoulder disposed in spaced relation to an outer wall of said housing so as to form a first recess therein that comprises a profile that is shaped substantially similar to the shape of said outer shoulders and a second internal shoulder disposed in spaced relation to said first internal shoulder so as to form a second recess therebetween that is shaped substantially similar to the shape of said annular shoulder.

\* \* \* \* \*